(12) United States Patent
Abe

(10) Patent No.: US 7,610,509 B2
(45) Date of Patent: Oct. 27, 2009

(54) FAULT TOLERANT COMPUTER SYSTEM

(75) Inventor: Shinji Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 11/304,890

(22) Filed: Dec. 16, 2005

(65) Prior Publication Data

US 2006/0150003 A1    Jul. 6, 2006

(30) Foreign Application Priority Data

Dec. 16, 2004    (JP)    ............................. 2004-364977

(51) Int. Cl.
*G06F 11/00*    (2006.01)
(52) U.S. Cl. ...................................................... 714/11
(58) Field of Classification Search .................. 714/12, 714/11
See application file for complete search history.

(56) References Cited

U.S. PATENT DOCUMENTS

| | | | | |
|---|---|---|---|---|
| 6,240,526 | B1 * | 5/2001 | Petivan et al. ................. | 714/11 |
| 6,473,869 | B2 * | 10/2002 | Bissett et al. ................. | 714/12 |
| 6,496,940 | B1 * | 12/2002 | Horst et al. .................... | 714/4 |
| 6,633,996 | B1 * | 10/2003 | Suffin et al. .................... | 714/4 |
| 2002/0065996 | A1 * | 5/2002 | Garnett et al. .............. | 711/156 |
| 2002/0144175 | A1 * | 10/2002 | Long et al. .................... | 714/11 |
| 2002/0144177 | A1 * | 10/2002 | Kondo et al. .................. | 714/13 |
| 2002/0152419 | A1 * | 10/2002 | McLoughlin et al. ......... | 714/11 |

FOREIGN PATENT DOCUMENTS

| | | |
|---|---|---|
| JP | 5-94277 A | 4/1993 |
| JP | 9-16426 A | 1/1997 |
| JP | 11-149457 A | 6/1999 |
| JP | 2002-77186 A | 3/2002 |
| JP | 2004-280732 A | 10/2004 |

OTHER PUBLICATIONS

Microsoft Publication: Windows Platform Design Notes: "PCI-to—PCI Bridges and CardBus Controllers on Windows 2000, Windows XP, and Windows Server 2003" Version 1.10—Apr. 22, 2004.*

* cited by examiner

*Primary Examiner*—Scott T Baderman
*Assistant Examiner*—Yair Leibovich
(74) *Attorney, Agent, or Firm*—Sughrue Mion, PLLC

(57) ABSTRACT

A fault tolerant (FT) computer system includes a first system; and a second system configured to operate in synchronization with the first system. Each of the first and second systems includes a CPU; and a routing controller connected with the CPU. The first system includes a first I/O device as an activist I/O device, and the second system includes a second I/O device as a standby I/O device. The routing controller controls a routing between the CPU and the first I/O device and the second I/O device. When a fault has occurred in the first I/O device, the routing controller in said first system routes a request data a request data received from the CPU and destined to the first I/O device, to the second I/O device.

29 Claims, 14 Drawing Sheets

Fig. 5A

PCI CONFIGURATION REGISTER

| DEVCE ID | | VENDOR ID | | 00h |
|---|---|---|---|---|
| STATUS | | COMMAND | | 04h |
| CLASS CODE | | | REV. ID | 08h |
| BIST | HEADER TYPE | LATENCY TM. | CACHE LINE | 0Ch |
| BASE ADDRESS | | | | 10h |
| | | | | 14h |
| | | | | 18h |
| | | | | 1Ch |
| | | | | 20h |
| | | | | 24h |

Fig. 5B

CLASS CODE REGISTER

| 0Bh | 0Ah | 09h |
|---|---|---|
| BASE CLASS | SUB CLASS | INTERFACE |

VGA DEVICE=030000h
OTHER DEVICE=FF0000h

Fig. 7

| | |
|---|---|
| 51 | CONFIG ADDRESS ROUTING CONTROL ENABLE |
| 52 | DEFAULT TARGET DEVICE |
| 53a | PRIMARY DEVICE PCI CONFIG NUMBER |
| 53b | SECONDARY DEVICE PCI CONFIG NUMBER |
| 54a | PRIMARY DEVICE CLASS CODE REPLACE ENABLE |
| 54b | SECONDARY DEVICE CLASS CODE REPLACE ENABLE |
| 55 | REPLACE CLASS CODE |
| 56a | PRIMARY VGA ENABLE BIT HIDE ENABLE |
| 56b | SECONDARY VGA ENABLE BIT HIDE ENABLE |
| 57a | PRIMARY BASE ADDRESS |
| 57b | PRIMARY ADDRESS SIZE |
| 58a | SECONDARY BASE ADDRESS |
| 58b | SECONDARY ADDRESS SIZE |

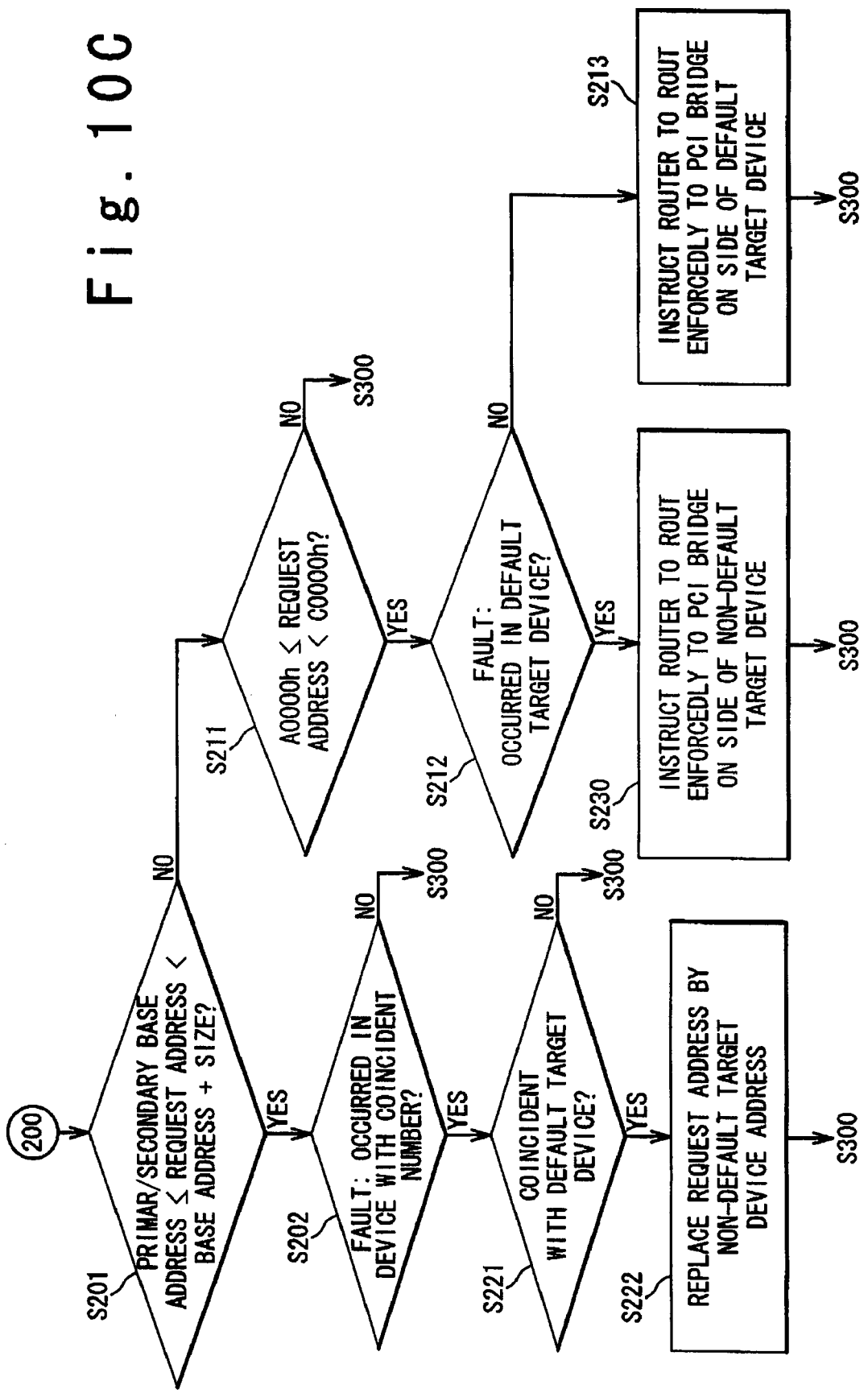

FAULT TOLERANT COMPUTER SYSTEM

BACKGROUND OF THE INVENTION

1. Field of the Invention

The present invention relates to a fault tolerant (FT) computer system. In particular, the present invention relates to a technique for controlling an I/O device in an FT computer system.

2. Description of the Related Art

A server used in essential business such as traffic control, finance, and stock is responsible for a base of a social life. Thus, high reliability and fault tolerance are required for the server. Also, in the business server of a corporation, the hosting service using the Internet, and the like, the down of the server caused by a fault may result in a severe commercial loss. In this way, the demand for the high reliability server has been increased in a wide field.

As the computer system having the high reliability, a "Fault Tolerant (FT) Computer System" is known. In the FT computer system, hardware modules such as CPU and memory of the system are duplexed or multiplexed, and the respective modules are controlled to operate in synchronization with a same clock. When a fault has occurred in a certain portion of system, i.e., one module, the fault module is logically separated from the system, and the normally operating modules continue a process. Thus, the fault tolerance is improved.

FIG. 1 is a conceptual view showing the configuration of the typical FT computer system. This FT computer system 100 has duplexed hardware modules and a fault tolerant controller (FT controller) 110 connected to the hardware modules. In FIG. 1, CPUs 120 (120a, 120b), main memory 130 (130a, 130b) and I/O devices 140 (140a, 140b) are duplexed. One CPU 120a (120b) and one main memory 130a (130b) constitute one CPU subsystem 150. In short, this FT computer system 100 is duplexed by the two CPU subsystems 150. The two CPU subsystems 150 are controlled to operate in synchronization with a same clock. Also, the duplexed I/O devices (groups) 140 constitute an 10 subsystem 160. The FT controller 110 controls the CPU subsystems 150 and the IO subsystem 160. Specifically, the FT controller 110 carries out the maintenance of the synchronous operation (two-system synchronous operation) between the two CPU subsystems 150, the detection of a fault in a module, the separation control of the fault module, and the like.

Generally, the FT computer system is divided into a portion in which the dual control is carried out in hardware, and a portion in which the dual control is carried out in software. For example, the CPU subsystem 150 of the CPU 120 and the main memory 130 is the base where the software itself is operated. Thus, the CPU subsystem 150 is required to be dually controlled in hardware. When a fault has occurred in the CPU subsystem 150a, the FT controller 110 (hardware) instantly separates the fault CPU or memory from the system. Thus, without any stop of the system, the process is continued by the remaining CPU subsystem 150b and IO subsystem 160. On the other hand, the IO subsystem 160 is dually controlled in software. For example, when a fault has occurred in an I/O device 140a, the FT controller 110 detects the fault and carries out an error report to a software program (hereinafter, to be referred to as an "I/O Device Driver") that controls the I/O device 140a. At this time, the I/O device driver stops the use of the fault I/O device 140a and uses the duplexed different I/O device 140b instead of it. In this way, the switching between the I/O devices 140 in the IO subsystem 160 is carried out in software.

In order to carry out the switching control for the I/O devices 140 as mentioned above, the I/O device driver is required to have a function of recognizing the error report from the FT controller 110 and a function of carrying out the switching process to a substitution I/O device. That is, the I/O device driver to drive the I/O devices 140 and an operating system (OS) for collectively control the driver are required to be adaptive for the FT computer system.

Japanese Laid Open Patent Application (JP-A-Heisei, 9-16426) discloses an I/O switching technique, in an FT computer having a two-port console. This conventional technique aims to carry out monitor and maintenance by the single console without any connection switching of cables. The FT computer based on this conventional technique has two systems of console outputs, and their input/output buses are switched when a fault has occurred. The switching between their input/output buses is carried out in response to a command from OS. Thus, it is considered in this conventional technique that the dedicated OS is required to be used.

By the way, in recent years, a so-called "Open System" using an Intel-compatible CPU ("Intel" is registered trademark) is a trend in the field of the server. As the main tendency, the I/O device produced by an independent hardware vendor is installed in an open PC server system, and the I/O device driver produced by the same vendor is used to control the I/O device. However, most of such I/O device drivers are not produced under the consideration of the FT computer system. In such I/O device drivers, the switching function between the I/O devices is not installed at all. Also, the I/O devices installed typically in the open computer system such as a video adaptor (VGA: Video Graphics Adaptor) are directly accessed from OS in many cases. However, it is actually impossible to apply a modification for the fault tolerant computer system to the OS mainly used in the open computer system.

The high reliability server corresponding to the open hardware and software systems is demanded. The technique is demanded which can attain the fault tolerant computer system in accordance with the open OS or I/O device driver. In particular, the technique that can carry out the dual control for the I/O devices is desirable in order to improve the fault tolerance and reliability in the open server system.

In conjunction with the above description, a portable computer is disclosed in Japanese Laid Open Patent Application (JP-A-Heisei 5-94277). The portable computer of this conventional example is provided with a display unit composed of a monochrome panel and a color panel, a monochrome panel display control circuit which controls display of the monochrome panel, and a color panel display control circuit which controls display of the color panel. A setting section sets a selection data to a switching section, which switches the monochrome panel display control circuit and the color panel display control circuit based on the selection data.

Also, a degrade system of a cluster connection multi-processor system is disclosed in Japanese Laid open Patent Application (JP-A-Heisei 11-149457). The multi-processor system of this conventional example is provided with a plurality of CPUs, a plurality of CPU control sections to control the plurality of CPUs, and a memory and an I/O control section which are shared by the plurality of CPUs. The plurality of CPUs and the plurality of CPU control sections are connected a cluster bus, and the plurality of CPU control sections are connected by a system bus. The CPU control section at least contains a control register (as a freeze register) to control disconnection of the CPU from the cluster bus and a control register (as a "CPU status register") to indicate a connection situation of the CPU and the cluster bus. When each of the CPUs on the cluster bus starts an operation, a flag is written in the CPU status register corresponding to the CPU to indicate a cluster connection. Then, an initial diagnosis of the CPUs is started, when a fault is detected in one CPU, the fact is written in the frieze register. The fault CPU is logically disconnected from the cluster bus. The CPU control section never responds to a request from the fault CPU absolutely, and controls to separate the fault CPU from the system.

Also, a switching unit of a multiplexing apparatus is disclosed in Japanese Laid Open Patent Application (JP-P2002-77186A). In the multiplexing apparatus of this conventional example, the switching unit is provided between a connection origin apparatus and a plurality of connection destination apparatuses which are multiplexed, to select and connect one of the connection destination apparatuses and the connection origin apparatus. In the switching unit, a storage section stores connection priority levels of the connection destination apparatuses. A first signal input/output section is connected with the connection origin apparatus. A second signal input/output section is connected with the plurality of connection destination apparatuses through communication lines and inputs and outputs data from and to a specific one of the connection destination apparatuses. A routing section connects the first and second signal input/output sections directly and indirectly. A selecting section selects one of the connection destination apparatuses which has a high connection priority level as the specific connection destination apparatus. Also, the selecting section selects one of the connection destination apparatuses which has a lower connection priority level than that of the specific connection destination apparatus, when confirming generation of a connection fault in the specific connection destination apparatus based on a monitor signal of the second input section, and selects one of the connection destination apparatuses which has a higher connection priority level than that of the specific connection destination apparatus, when confirming elimination of a connection fault in the connection destination apparatus with the higher connection priority level based on the monitor signal of the second input section.

Also, a fault tolerant system is disclosed in Japanese Laid Open Patent Application (JP-P2004-280732A). In the fault tolerant system of this conventional example, first and second north bridges and duplexed and first and second input/output bus bridges are duplexed, and an asynchronous interface is used as an interface between the first and second north bridges and the first and second input/output bus bridges. A section is provided for each of the first and second north bridges to synchronize data transmission and reception for the asynchronous interface between the first and second north bridges.

SUMMARY OF THE INVENTION

It is therefore an object of the present invention to provide a fault tolerant (FT) computer system in which open-system hardware and software are used as a base.

Another object of the present invention is to provide an FT computer system that can carry out a dual control of I/O devices, without modifying an existing OS or I/O device driver.

Still another object of the present invention is to improve the fault tolerance and reliability of an open-system server.

In an aspect of the present invention, a fault tolerant (FT) computer system includes a first system as an active system comprising first I/O devices; and a second system as a standby system comprising second I/O devices, which are same as the first I/O devices, connected with the first system through a link section, and configured to operate in synchronization with the first system. Each of the first and second systems includes a CPU; and a routing controller connected with the CPU. The routing controller in the first system controls a routing between the CPU in the first system and the first I/O devices and the second I/O devices. When a fault has occurred in one of the first I/O devices, the routing controller in the first system routes a request data received from the CPU in the first system and destined to the first I/O device, to one of the second I/O devices corresponding to the I/O device.

Here, the routing controller in the first system may include an address converter connected with the CPU; a response data converter connected with the CPU; and a router connected with the address converter and the response data converter. When the fault has occurred in the first I/O device, the address converter may generate a converted request data from the request data by replacing a device data indicating the first I/O device by a device data indicating the second I/O device, if receiving the request data from the CPU, and may forward the converted request data to the router. The router may route the converted request data to the second I/O device based on the device data contained in the converted request data.

In this case, the device data may be a PCI bus number, a device number and a function number in a PCI hierarchy structure. In this case, the routing controller in the first system may further include a register referred to from the address converter and configured to store the PCI bus number, the device number and the function number.

Also, the device data may be an address in a system memory map space. In this case, the routing controller in the first system may further include a register referred to from the address converter and configured to store the address.

Also, the response data converter may generate a converted response data from a response data by rewriting a part of the response data, when the second I/O device operates in a normal state and the response data converter receives the response data from the second I/O device through the router, and may output the converted response data to the CPU in the first system. In this case, the response data converter may generate the converted response data by replacing a class code of the second I/O device which is contained in the response data by another class code. Also, the routing controller in the first system may further include a register referred to from the response data converter and configured to store the another class code.

Also, the first system comprises a first PCI bridge as one of the first I/O devices connected with the routing controller of the first system and the first I/O device, and the second system comprises a second PCI bridge as one of the second I/O devices connected with the routing controller of the second system and the second I/O device. A VGA Enable bit of the first PCI bridge and a VGA Enable bit of the second PCI bridge are preferably both set to Enable when the first I/O device and the second I/O device operate in a normal state.

In this case, when an access to the VGA Enable bit of the second PCI bridge is generated, the response data converter may receive the VGA Enable bit from the second PCI bridge through the router, and may convert the received VGA Enable bit into Disable.

Also, the first I/O devices and the second I/O devices may be open-system devices.

Also, the first I/O device and the second I/O device may be VGA devices.

BRIEF DESCRIPTION OF THE DRAWINGS

FIG. 5A is a conceptual view showing a content of a PCI configuration register in the FT computer system of the present invention;

FIG. 5B is a conceptual view showing a content of a class code register in the FT computer system of the present invention;

FIG. 7 is a conceptual view showing the configuration of a routing control register group in the FT computer system of the present invention;

FIGS. 10A to 10C are a flowchart showing an operation of the FT computer system according to the present invention;

DESCRIPTION OF THE PREFERRED EMBODIMENTS

Hereinafter, a fault tolerant (FT) computer system according to the present invention will be described in detail with reference to the attached drawings.

Figure 2:
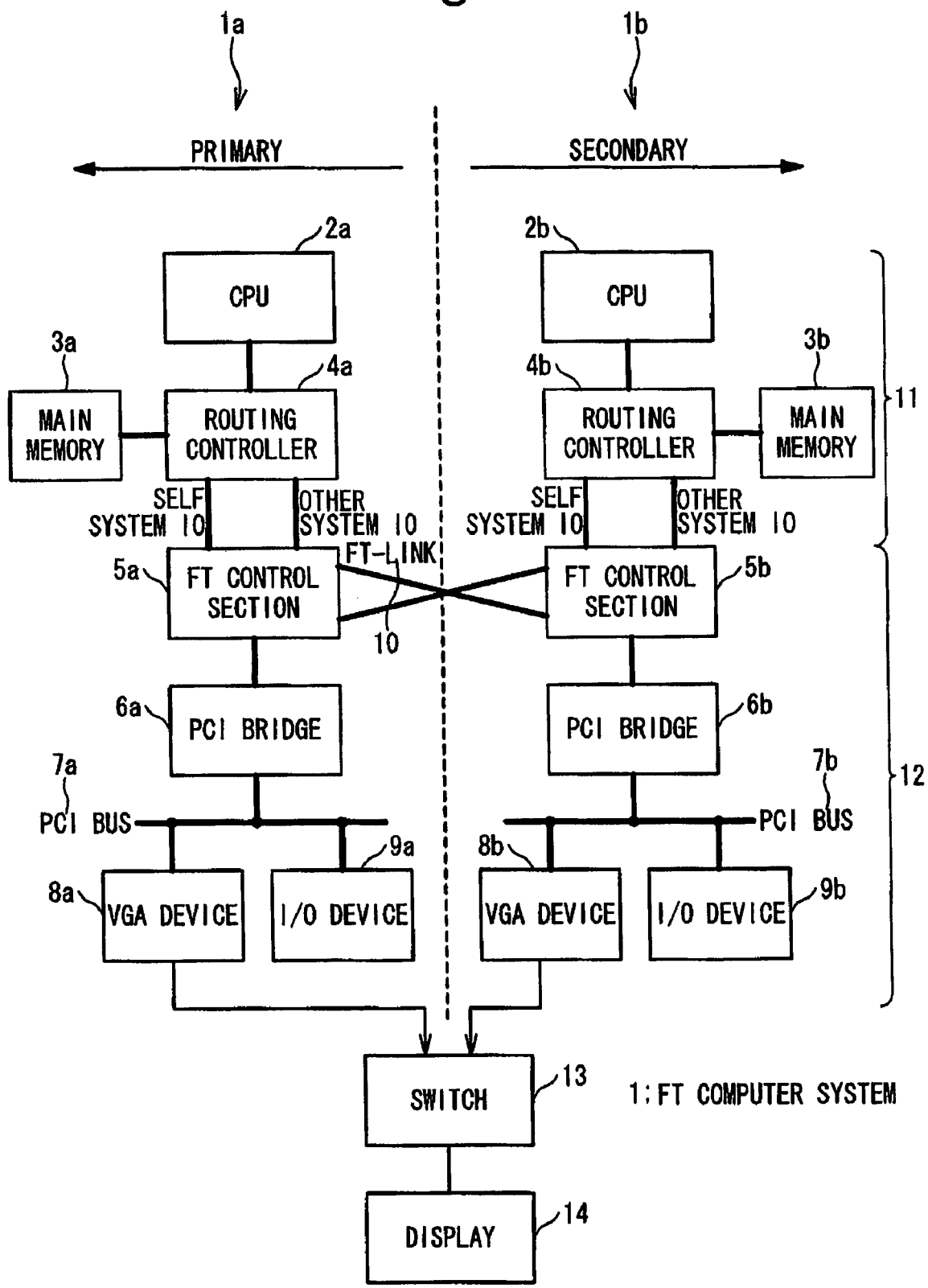
FIG. 2 is a block diagram showing the configuration of a fault tolerant (FT) computer system according to the present invention.

FIG. 2 is a block diagram showing the configuration of the FT computer system according to the present invention. The FT computer system 1 is provided with a primary system 1a and a secondary system 1b which are duplexed.

The primary system la is provided with a CPU 2a, a main memory 3a, a routing controller 4a, an FT control section 5a (first FT control section), a PCI bridge 6a, a PCI bus 7a, a VGA device 8a and an I/O device 9a. The secondary system 1b has the same configuration as the primary system 1a and is provided with a CPU 2b, a main memory 3b, a routing controller 4b, an FT control section 5b (second FT control section), a PCI bridge 6b, a PCI bus 7b, a VGA device 8b and an I/O device 9b. In both of the primary and secondary systems, a set of the CPU 2 (2a, 2b), the main memory 3 (3a, 3b), the routing controller 4 (4a, 4b) and a part of the FT control section 5 (5a, 5b) constitutes a CPU subsystem 11 (11a, 11b). The CPU subsystems 11 in the both Systems operate perfectly in synchronization with each other, including clocks. Also, a part of the FT control section 5 (5a, 5b), the PCI bridge 6 (6a, 6b) and duplexed I/O device groups (8a, 9a, and 8b, 9b) constitute I/O subsystems 12 (12a, 12b). The I/O subsystem 12 and one CPU subsystem 11 operates as one computer system.

The routing controller 4 is connected to the CPU 2, the main memory 3 and the FT control section 5. The routing controller 4 is also referred to as a north bridge and acts as a role for routing a request from the CPU 2 to the memory or I/O subsystem. Here, the routing controller 4 is connected through two paths to the FT control section 5. This is because the I/O device group (8a, 9a, and 8b, 9b) is duplexed. In short, the routing controller 4 determines whether a certain access should be carried out on the I/O device (8a, 9a) on the primary system side or the I/O device (8b, 9b) on the secondary system side. The routing controller 4 selects one of the two paths in accordance with the determination result, and carries out the routing of a request for the access.

The FT control section 5 compares and checks the operations of both of the two CPU subsystems 11 and keeps the synchronization between the primary/secondary CPU subsystems 11. Also, the FT control section 5 carries out the detection of a fault in a module based on an error check, the separation control of a fault module and the like.

The PCI bridge 6 connects the respective I/O devices 8 and 9 and the FT control section 5 through the PCI bus 7. According to the present invention, the dual control of the I/O devices is attained. As the I/O device that is a target for the dual control, the VGA (Vide Graphics Adaptor) device 8 is exemplified. The VGA device is one of legacy I/O devices, and is directly accessed from OS operating on the CPU 2 in many cases. It should be noted that the PCI bridge 6 and I/O devices 8 and 9 used in this embodiment have been used in a typical open-system server. The units having special functions for the fault tolerance are the routing controller 4 and the FT control section 5.

Also, as shown in FIG. 2, the first FT control section 5a and the second FT control section 5b are connected through FT links 10. Each of the FT links 10 is used for the access from one of the CPU subsystems 11 to the I/O subsystem 12 of the other. In short, one of the FT links 10 is used for the access from the CPU subsystem 11a of the primary system la to the I/O devices 8b and 9b of the secondary system 1b and the other of the FT links 10 is used for the access from the CPU subsystem 11b of the secondary system 1b to the I/O devices 8a and 9a of the primary system 1a. Thus, the first FT control section 5a can handle the accesses from the CPU subsystems 11 in the both systems 1 to the PCI bridge 6a and the I/O devices 8a and 9a under the administration thereof, and the second FT control section 5b can handle the accesses from the CPU subsystems 11 in the both systems to the PCI bridge 6b and the I/O devices 8b and 9b under the administration thereof. The synchronization check of the both systems is limited to the range handled by the FT control sections 5. Therefore, in this FT computer system, the synchronization check carried out by the FT control sections 5 is dispersedly executed.

Also, as shown in FIG. 2, the two VGA devices 8a and 8b are connected through a switch 13 to a display 14. The FT computer system 1 according to this embodiment originally has two VGA outputs since VGA devices 8a and 8b are duplexed. However, since the number of the displays 14 is limited to one, this switch 13 switches the VGA outputs. Usually, the display 14 is connected to the output of the VGA device 8 on the primary system side. At the time of a fault occurrence, the connection between the display 14 and the VGA device output is properly switched based on the control of the FT control section 5. Only one VGA device 8 exists to be connected in the FT computer system as the standard VGA device.

Figure 3:
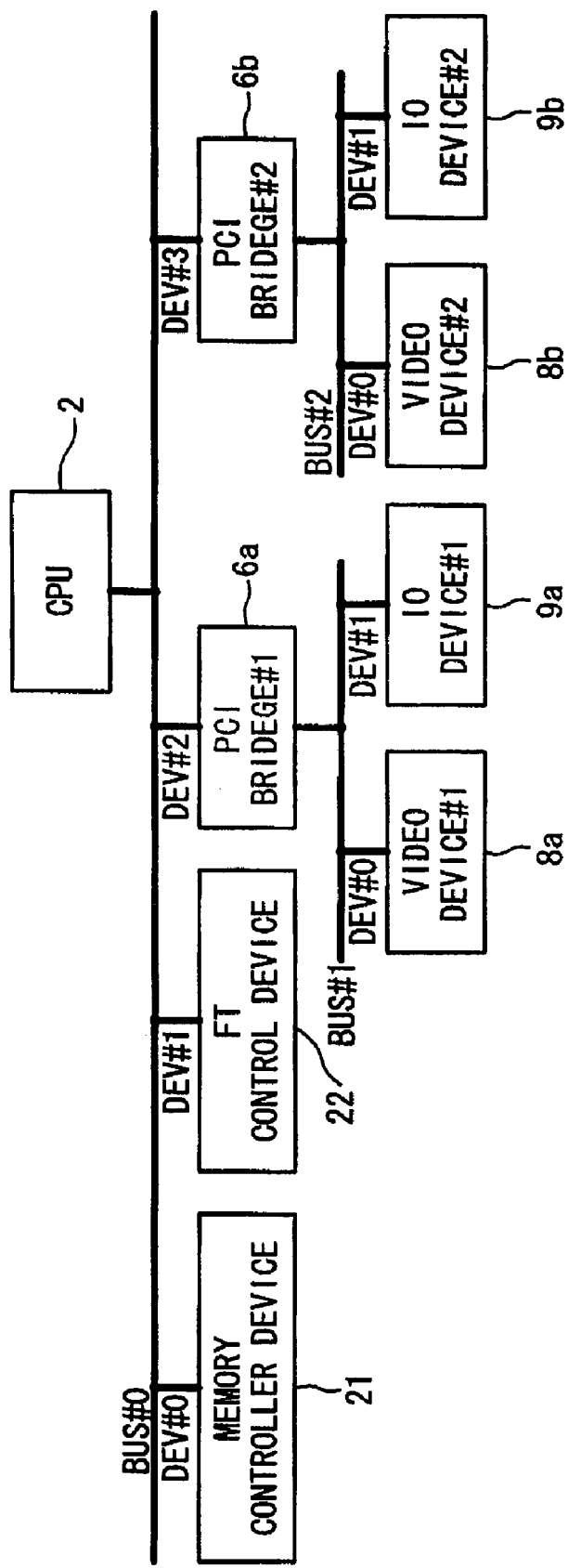
FIG. 3 is a conceptual view showing a PCI hierarchical structure in the FT computer system.

FIG. 3 is a conceptual view showing the PCI (Peripheral Component Interconnect) hierarchical structure in the FT computer system 1 according to this embodiment. PCI bus numbers, device numbers and function numbers are given to all accessible devices in accordance with "PCI Bus Specification". Thus, the hierarchical structure where the CPUs 2 serve as apexes is obtained. For example, "Device #0" is allocated to a memory controller device 21 existing in the routing controller 4. "Device #1" is allocated to an FT control device 22 existing in the FT control section 5. "Device #2" is allocated to the PCI bridge 6a (the first PCI bridge; PCI Bridge #1) of the primary system 1a. "Device #3" is allocated to the PCI bridge 6b (the second PCI bridge: PCI Bridge #2) of the secondary system 1b. The memory controller device 21, FT control device 22, first PCI bridge 6a and second PCI bridge 6b are located in the lower layer of the CPU 2 and connected to the CPU 2 through the bus to which "Bus #0" is allocated.

Also, the VGA device (Video Device #1) 8a and the I/O device (I/O Device #1) 9a exist under the administration of the first PCI bridge 6a, and those VGA device Ba and I/O device 9a are connected to the first PCI bridge 6a through the bus to which "Bus #1" is allocated. "Device #0" is allocated to the VGA device 8a, and "Device #1" is allocated to the I/O device 9a. Also, when the VGA device (Video Device #2) 8b and the I/O device (I/O Device #2) 9b exist under the administration of the first PCI bridge 6b, the VGA device 8b and I/O device 9b are connected to the second PCI bridge 6b through the bus to which "Bus #2" is allocated. "Device #0" is allocated to the VGA device 8b, and "Device #1" is allocated to the I/O device 9b.

In order to allow the VGA device 8 and the I/O device 9 to be accessed by software programs including the OS operated on the CPU 2, there are three methods of (1) PCI Configuration Access, (2) IO Mapped Access, and (3) Memory Mapped PCI Access. Of them, when "PCI Configuration Access" is carried out, an access request is forwarded by referring to the hierarchical structure shown in FIG. 3. In short, the access request is forwarded through the routing controller 4, the FT control section 5 and the PCI bridge 6 to the bus having the corresponding PCI bus number. Finally, the access request reaches the VGA device 8 or I/O device 9 as a target.

Figure 4:
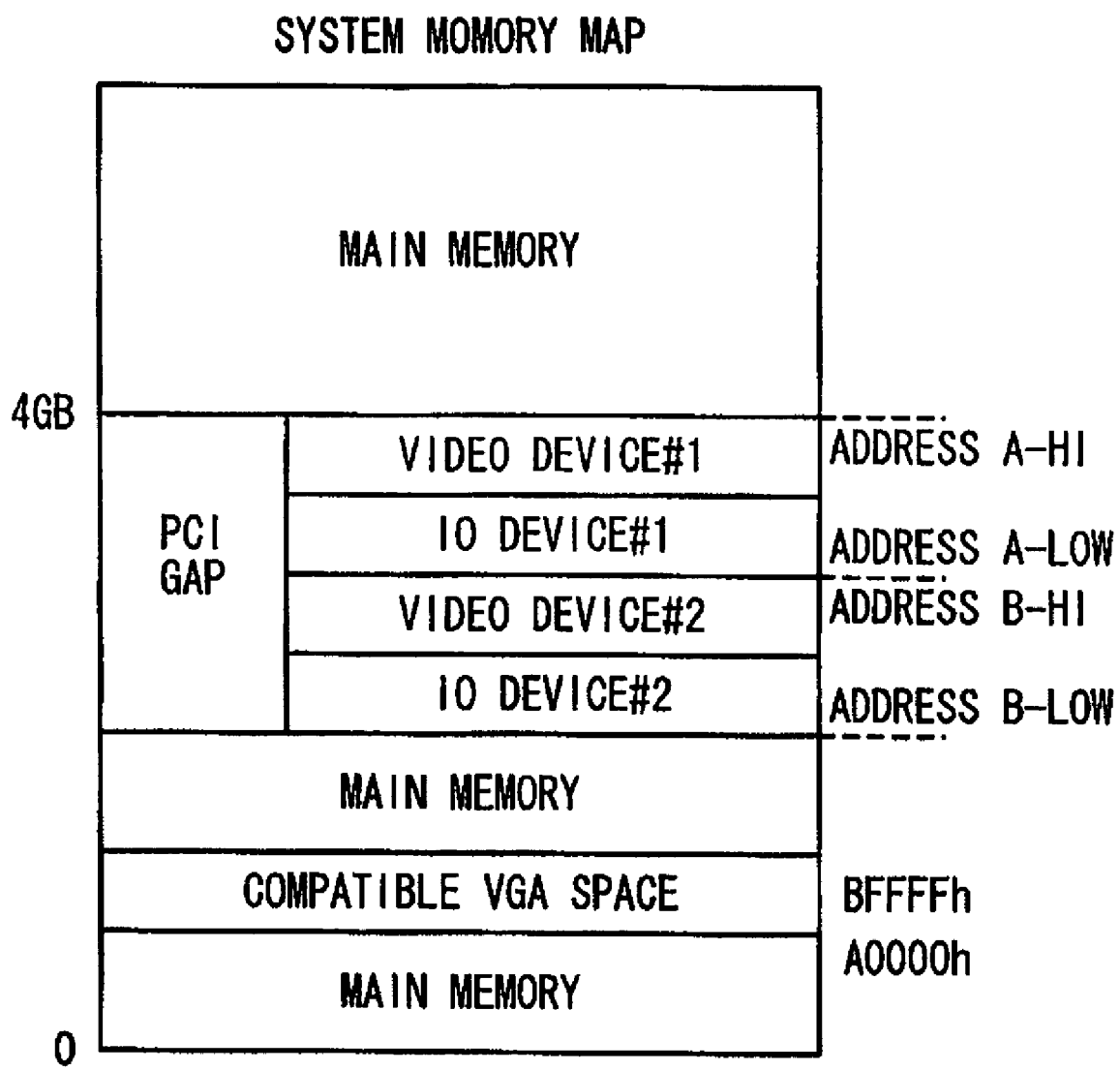
FIG. 4 is a conceptual view showing a system memory map in the FT computer system of the present invention.

Also, FIG. 4 is a conceptual view showing a system memory map according to this embodiment. Each of the VGA device 8 and the I/O device 9 is allocated with an address space. In case of the Intel-compatible system used generally in the open-system server, as shown in FIG. 4, the VGA device 8 and the I/O device 9 are mapped on the system memory space of the addresses of 4 gigabytes or less. For example, the access request to the address space from "Address A-low" to "Address A-hi" is forwarded to the first PCI bridge 6a by the routing controller 4. Then, the first PCI bridge 6a forwards it to the PCI bus "Bus #1". At this time, each of the devices connected to "PCI Bus #1" refers to the address of the access request issued on the bus, and receives this access request if it is matched with a self-address space.

Also, in the Intel-compatible system, the access to the address space of "A0000h to BFFFFh" is handled as a Standard VGA Space as shown in FIG. 4. The access request to this standard VGA space is forwarded to the standard VGA device solely existing in the FT computer system. In this case, as an assumption condition, the standard VGA device is determined by a system software program such as BIOS when the FT computer system is started. Then, a "VGA Enable bit" is set in a PCI configuration register of the PCI bridge 6 where manages or controls the standard VGA device exists. When the access request to the address space of "A0000h to BFFFFh" is detected, the routing controller 4 forwards the access request to the PCI bridge 6 in which the VGA Enable bit has been set. Thus, the access to the standard VGA device is attained. When the foregoing "Memory Mapped PCI Access" is carried out, the access request is forwarded by referring to the system memory map shown in FIG. 4.

FIG. 5A conceptually shows a part of an address space of the PCI configuration register of the typical I/O device. Also, FIG. 5B conceptually shows a class code register. Generally, the driver and the OS access the space of all the devices in the system and carry out the mapping on the address space for each manufacturer of the devices and each kind. For example, an identifier indicating the type of the I/O device is written in a class code field. The address of this class code field is "030000h" in case of the VGA device 8 and "FF0000h" in case of the I/O device that does not belong to any category. These addresses are defined by "PCI Bus Specification".

The items with regard to FIGS. 3, 4, 5A and 5B as mentioned above are defined in "PCI Bus Specification".

Figure 6:
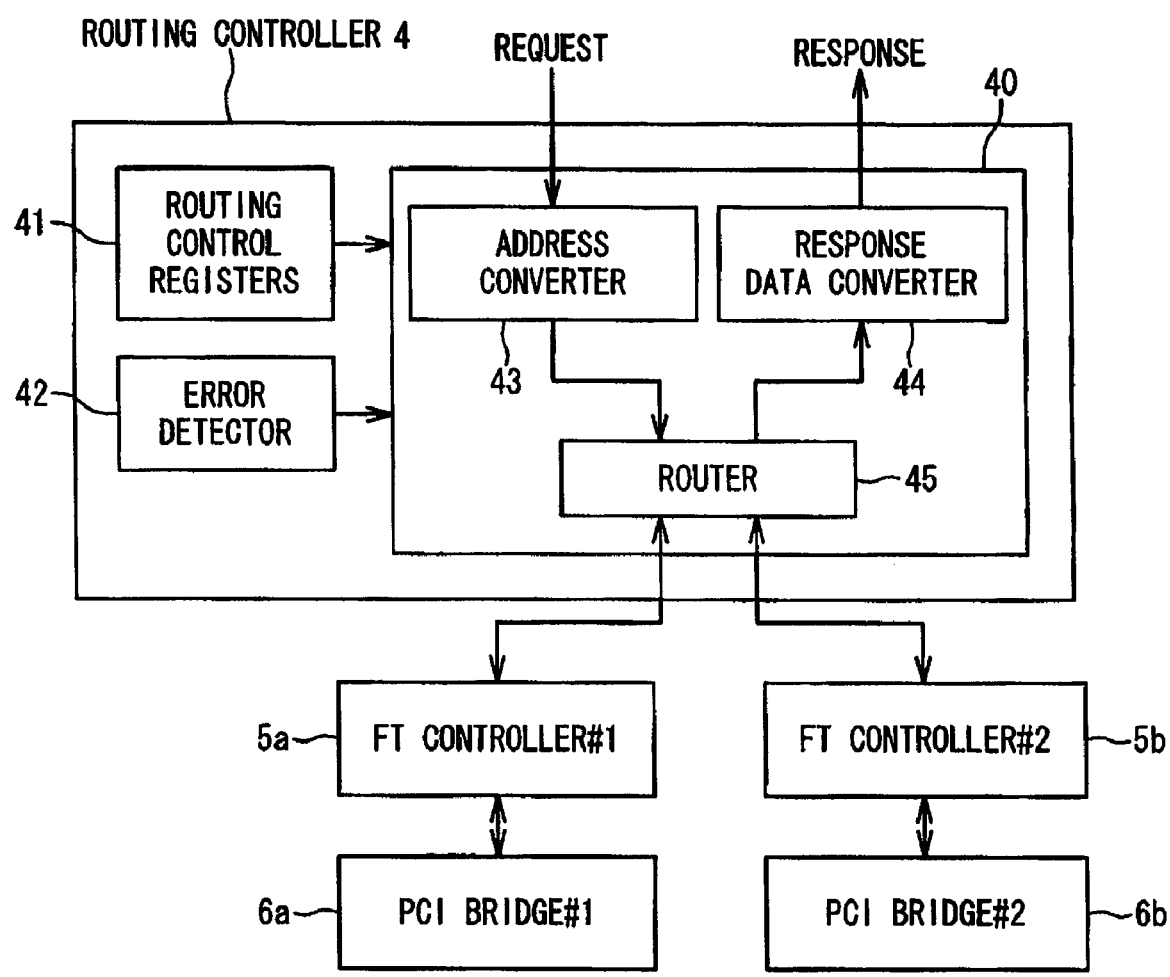
FIG. 6 is a block diagram showing the configuration of a routing controller in the FT computer system of the present invention.

The routing controller 4 according to the present invention attains the dual control of the VGA device 8 in hardware. FIG. 6 is a block diagram showing the configuration of the routing controller 4 according to the present invention. The routing controller 4 decodes the address to the I/O device 8 or 9 as a target and carries out the suitable routing so that an access request from the CPU 2 is forwarded to the target. As shown in FIG. 6, the routing controller 4 according to the present invention includes a controller 40, routing control registers 41 and an error detector 42. Also, the controller 40 includes an address converter 43, a response data converter 44 and a router 45.

Various data for settings of the routing controller 4, which will be described later are stored in the routing control registers 41.

The error detector 42 holds an error data detected in the PCI bridge 6, the VGA device 8 and the I/O device 9, and reports the error detection to the controller 40.

The address converter 43 is connected to the CPU 2 and the router 45. The address converter 43 receives a request data from the CPU 2. At this time, the address converter 43 converts the address corresponding to the request, i.e., a request address in accordance with the setting of the routing control registers 41 and generates "Conversion Address Data". Then, the address converter 43 outputs "Conversion Request Data" including the generated conversion address data, to the router 45.

The router 45 is connected to the FT control sections 5a and 5b and carries out the routing in accordance with the conversion address data.

The response data converter 44 is connected to the CPU 2 and the router 45. The response data converter 44 receives a response data through the router 45 from the I/O device 9 or VGA device. At this time, the response data converter 44 rewrites a part of the received response data in accordance with the setting of the routing control registers 41, and generates "Conversion Response Data". Then, the response data converter 44 outputs the conversion response data as the response data to the CPU 2.

FIG. 7 is a conceptual view showing the configuration of the routing control registers 41 according to the present invention. The routing control registers 41 are provided with a plurality of registers 51 to 58 which will be described below.

Config. Address Routing Control Enable:

The register 51 is a register for activating/inactivating the function to carry out the dual control on the device such as the VGA device 8 and the like. When the register 51 is set to "Disable", the dual control of the hardware is stopped. In this case, the routing controller 4 carries out an operation similar to the conventional typical north bridge. When the register 51 is set to "Enable", the dual control of the hardware is started.

Default Target Device:

This register 52 is a register for specifying "Standard VGA Device" that is actually used among the two VGA devices 8a and 8b. When the system is started, any of "Primary" and "Secondary" is set in this register 52 by the BIOS. When the "Primary" is set, the VGA device 8a is employed as the standard VGA device. When the "Secondary" is set, the VGA device 8b is employed as the standard VGA device. When the error detector 42 reports the error of the PCI bridge 6 or VGA device 8, the routing controller 4 refers to this register 52 and switches the routing to the VGA device B.

Primary Device PCI Configuration Number:

Secondary Device PCI Configuration Number:

The PCI bus numbers, device numbers and function numbers of the VGA devices 8a and 8b, which are dually controlled, are set in each of the registers 53a and 53b. When the "PCI Configuration Access" is received as the access request from the CPU 2, the routing controller 4 compares them with the values stored in the registers 53a and 53b. Thus, the routing controller 4 can recognize the access to the VGA device 8.

Primary Device Class Code Replace Enable:

Secondary Device Class Code Replace Enable:

Each of the registers 54a and 54b is a register for activating/inactivating a function to replace the class code in accessing the class code register. When the registers 54 are set to "Enable", the routing controller 4 (response data converter 44) uses the value set in a "Replace Class Code" register 55 as described below and generates the "Conversion Response Data". In short, the response data converter 44 converts the response data for the access to the class code register for the VGA device 8a or 8b, by using the class code set in the "Replace Class Code" register 55. When the registers 54 are set to "Disable", the foregoing replacement is not carried out.

Generally, when the two VGA devices 8 exist in the system, the OS regards both of them as the different VGA devices 8 and operates to independently control them. However, the system according to the present invention is the fault tolerant computer system. When one VGA device 8a is used, the other VGA device 8b is required to be hidden from the OS. When a fault has occurred in one VGA device 8a, the other VGA device 8b is required to be used as a substitution device. Here, when the VGA device 8 itself is hidden, the device itself becomes invisible from the OS. Thus, the address of the hidden VGA device 8 is not registered in the system memory space. As a result, the setting of the address space for the PCI bridge 6 is not carried out, which physically disables the access to the substitution VGA device. For this reason, according to the present invention, the method is employed of replacing only the class code by a different value. Therefore, the unused VGA device 8 can be hidden in a pseudo manner.

Replace Class Code:

The value used in the above replacement is set in this register 55. When the access request to the class code register for the VGA device 8 that is not the device set as the "Default Target Device" is generated, the response data converter 44 of the routing controller 4 replaces the response data by the value set in the register 55. The class code of the VGA device 8 is defined as "030000h". However, according to the present invention, for example, the class code "FF0000h" indicating "Other Device" is set in the register 55. As a result, the OS recognizes the VGA device 8, which is not the device set in the "Default Target Device", as the typical I/O device.

Primary VGA Enable Bit Hide Enable:

Secondary VGA Enable Bit Hide Enable:

The registers 56a and 56b are registers for hiding the "VGA Enable bit" of the PCI bridge 6 which is an open-system device. The OS such as the Windows (registered trademark) does not guarantee the operation when the "VGA Enable bits" of the plurality of PCI bridges 6 are set to "Enable". Thus, in case of the conventional case, the "VGA Enable bit" was set only for one of the PCI bridges 6a and 6b. When the "VGA Enable bit" is not set to the "Enable", the PCI bridge 6 does not forward the access request to the standard VGA address space (A0000h to BFFFFh) to the lower PCI bus. However, the system according to the present invention is the FT computer system. When a fault has occurred in the VGA device 8 set to the "Default Target Device", the substitution VGA device must be used. Thus, it is necessary that the access request to the standard VGA space is not shut down by the PCI bridge 6 on the substitution VGA device side. That is, the "VGA Enable bit" of the PCI bridges 6a and 6b of the both systems must be set to "Enable". In order to solve the contradiction when the OS such as the Windows is applied to this system, the registers 56a and 56b provide the function of hiding the "VGA Enable bit". If the access to the "VGA Enable bit" of the PCI bridge 6 that the register 56 is set to "Enable" is detected, the response data converter 44 of the routing controller 4 replaces the response data and consequently hides the "VGA Enable bit".

Primary Base Address:

Secondary Base Address:

Primary Address Size:

Secondary Address Size:

The registers 57a, 57b, 58a and 58b are registers for setting the base addresses allocated to the respective VGA devices 8 and their sizes. The VGA device 8 has a memory space. In case of the Intel-compatible system, it is mapped to a part of the system memory space whose side is lower than 4 gigabytes. The addresses where the VGA devices 8a and 8b in both of the primary/secondary systems are mapped are set in the registers 57a and 57b. The registers 57a and 57b are referred to by the address converter 43, in order to convert the access request from the CPU 2 to the access request to the substitution VGA device, when the VGA device 8 set in "Default Target Device" is faulted. In short, the address converter 43 converts the address in order to make it appear to the OS as if the same VGA device 8 continues to be used even when a fault has occurred in the default VGA device 8. Therefore, it is possible to execute the access routing to the actually different substitution device while hiding the fault of the default VGA device 8 from the OS.

By the routing controller 4 as described above, it is possible to execute the address conversion and the switching control by using the hardware when a fault has occurred in the default VGA device 8. Thus, the FT computer system 1 can continue the process. Here, the foregoing control is carried out in the state hidden from the OS. Also, the error of the VGA device 8 and the like is perfectly hidden from the OS. In short, the situation that the normally operating device continues to be always used is generated for the OS in the pseudo manner. The number of the VGA devices 8 visible from the OS is always one. Thus, the dual control of the VGA device 8 is possible without any modification to the OS. Also, the dual control is possible, even if the open-system device is employed as the I/O devices 8 and 9 and the PCI bridge 6. That is, the duplication of the I/O devices can be attained even in the server including the existing OS, I/O devices and I/O device driver which are produced without any intention of the FT computer.

Next, one example of the operation of the FT computer system 1 according to the present invention will be described below in detail. In the FT computer system 1 shown in FIGS. 2 and 3, the I/O device groups 8 and 9 on the primary system side are assumed to be active I/O devices, and the I/O device groups 8 and 9 on the secondary system side are assumed to be standby I/O devices. The active I/O devices are the I/O device group used for the process, and the standby I/O devices are the I/O device group to be used instead of the faulted active I/O devices. In short, the VGA device 8*a* of the primary system 1*a* is the standard VGA device that is usually used, and the VGA device 8*b* of the secondary system 1*b* is the standby VGA device or substitution VGA device.

Here, it is supposed that the routing control registers 41 shown in FIG. 7 are set as described below.

Config. Address Routing Control Enable: "Enable"

Consequently, the dual control for the I/O devices by the hardware according to the present invention becomes active.

Default Target Device: "Primary"

As mentioned above, the VGA device 8*a* on the primary system side is set to be active. There is a case that the VGA device 8 (I/O device) on the side set in the register 52 is referred to as "Default".

Primary Device PCI Config. Number: "Bus #1, Dev #0, Func #0"

Secondary Device PCI Config. Number: "Bus #2, Dev #0, Func #0"

The device information under the PCI hierarchy shown in FIG. 3 is set in the register 53. The device information of the VGA device 8*a* on the primary system side is set in the register 53*a*, and the device information of the VGA device 8*b* on the secondary system side is set in the register 53*b*.

Primary Device Class Code Replace Enable: "Disable"

Secondary Device Class Code Replace Enable: "Enable"

Replace Class Code: "FF0000h"

The VGA device 8*a* on the primary system side is the VGA device visible from the OS. On the other hand, the VGA device 8*b* on the secondary system side is the VGA device hidden from the OS, and it is required to be recognized as "Other Device" by the OS. For this reason, the setting where the class code on the secondary system side is replaced by "FF0000h" is executed.

Primary VGA Enable bit Hide Enable: "Disable"

Secondary VGA Enable bit Hide Enable: "Enable"

Irrespectively of the active/standby status, the "VGA Enable bit" of the PCI bridges 6*a* and 6*b* are set to "Enable" by the BIOS. However, according to this embodiment, when the access request to "VGA Enable bit" of the PCI bridge 6*b* on the standby side is generated, the bit information is required to be hidden. For this reason, the register 56*b* to the secondary system side is set to "Enable".

Primary Base Address: F00__0000h

Primary Address Size: 200__0000h

Secondary Base Address: F800__0000h

Secondary Address Size: 200__0000h

The values of the registers 57*a*, 57*b* and 58*a*, 58*b* depend on the values of the base address register of the PCI configuration register (refer to FIG. 5A) of the VGA device 8. Here, it is supposed that the foregoing values are tentatively set.

Figure 8:
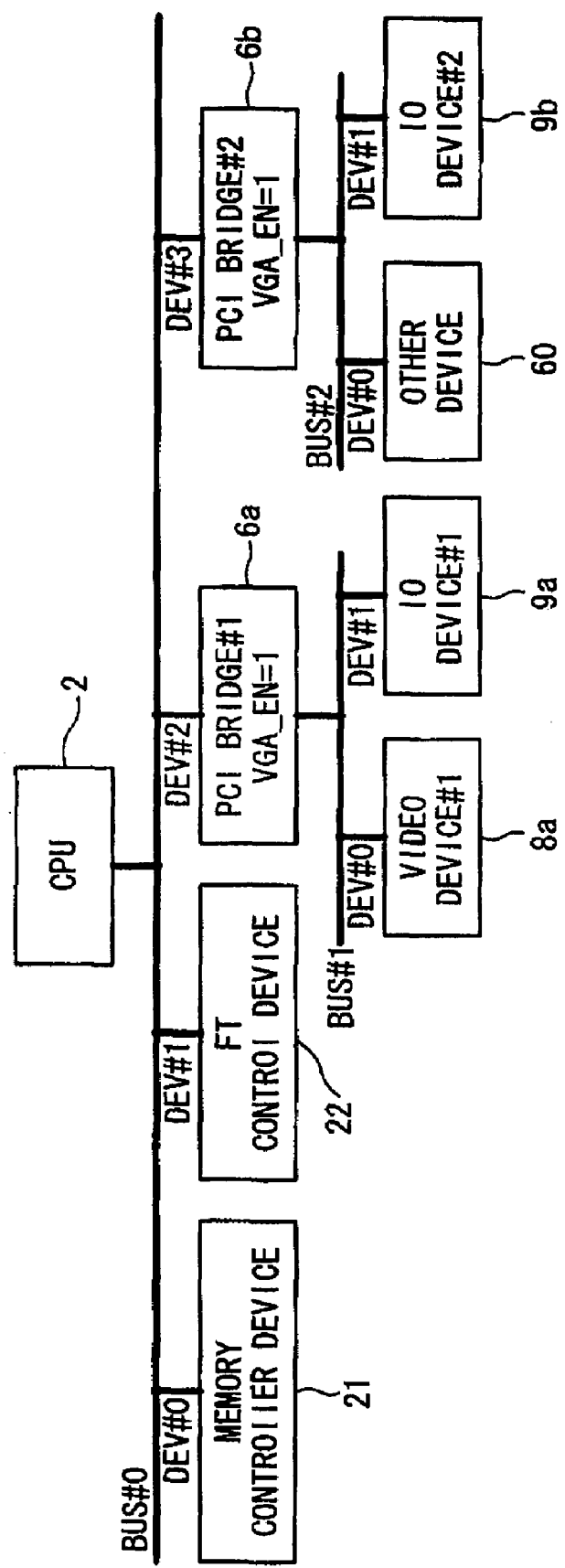
FIG. 8 is a conceptual view showing an example of the PCI hierarchical structure of the FT computer system of the present invention.
Figures 9A, 9B:
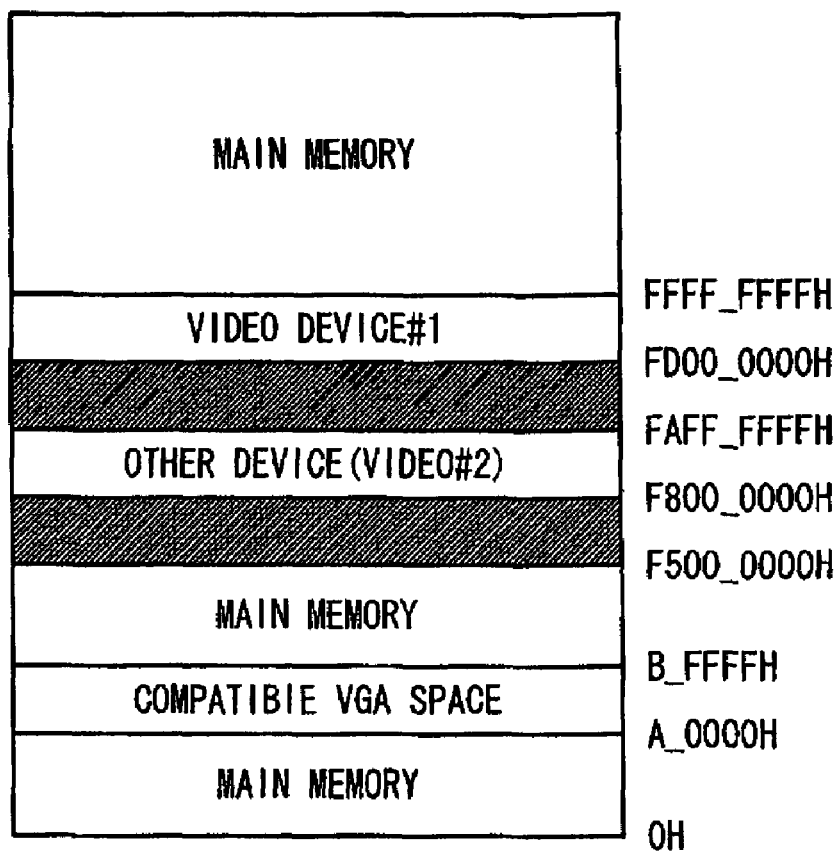
FIG. 9A is a conceptual view showing an example of the system memory map in the FT computer system of the present invention.
FIG. 9B is a conceptual view showing an example of the PCI configuration map in the FT computer system of the present invention.

By the above-mentioned settings, the PCI hierarchy of the system when it is viewed from the OS has the structure as shown in FIG. 8. Both "VGA Enable bits (VGA_En)" of the PCI bridges 6*a* and 6*b* on the active and standby sides are set to "Enable". Also, the VGA device 8*b* on the standby side is recognized as "Other Device 60" from the OS. Also, FIG. 9A shows the system memory map, and FIG. 9B shows the PCI configuration map. The active VGA device is mapped to "FD00__0000h to FFFF_FFFFh", and the standby VGA device is mapped to "F800__000h to FAFF_FFFFh". Also, the address "A0000h to BFFFFh" is treated as the compatible VGA space.

In order for the software including the OS on the CPU 2 to access the VGA device 8, there are at least 3 methods of (1) PCI Configuration Access, (2) Memory Mapped PCI Access and (3) IO Mapped Access. In the following description, the routing to the "PCI Configuration Access" and the routing to the "Memory Mapped PCI Access" will be especially described. It should be noted that the "IO Mapped Access" is substantially same as the routing to the "Memory Mapped PCI Access". Therefore, the description is omitted here.

Figure 10A:
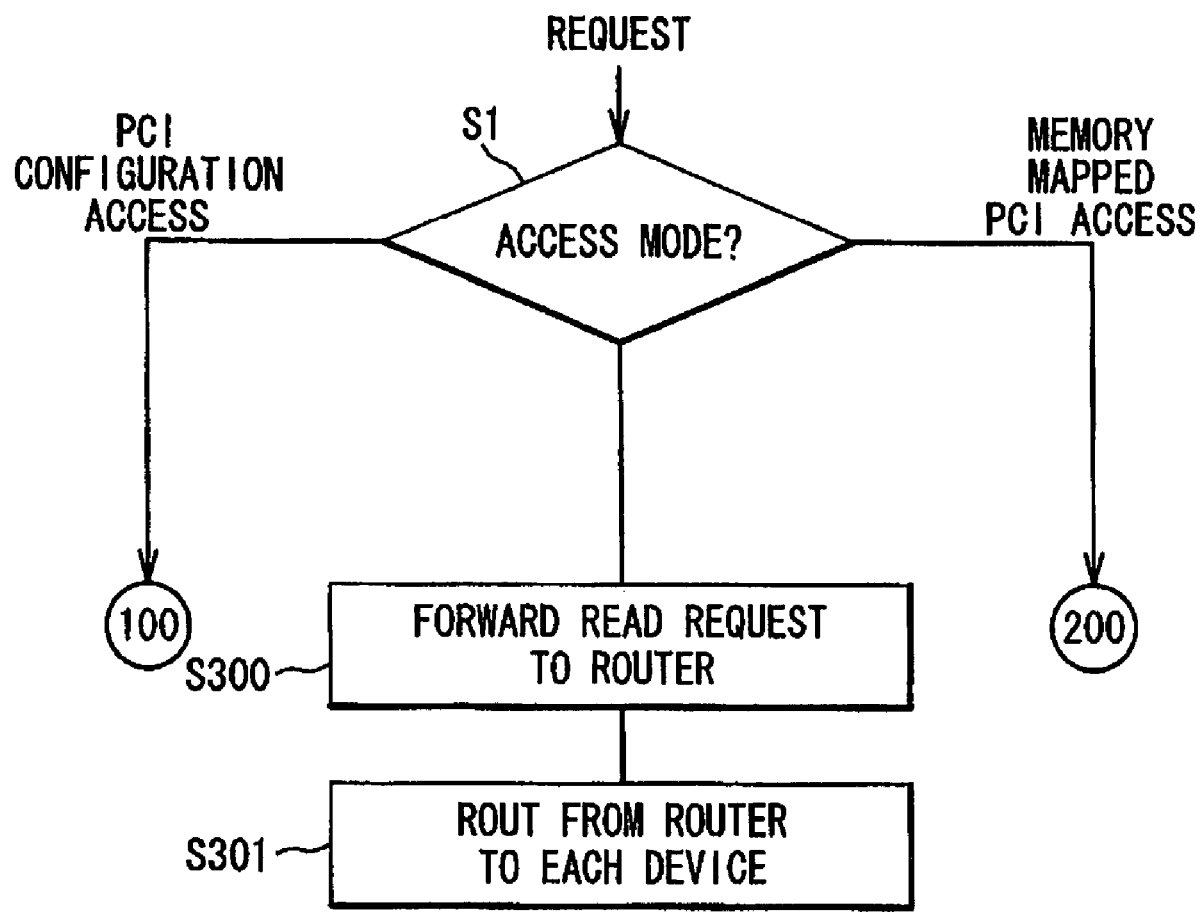
Figure 10B:
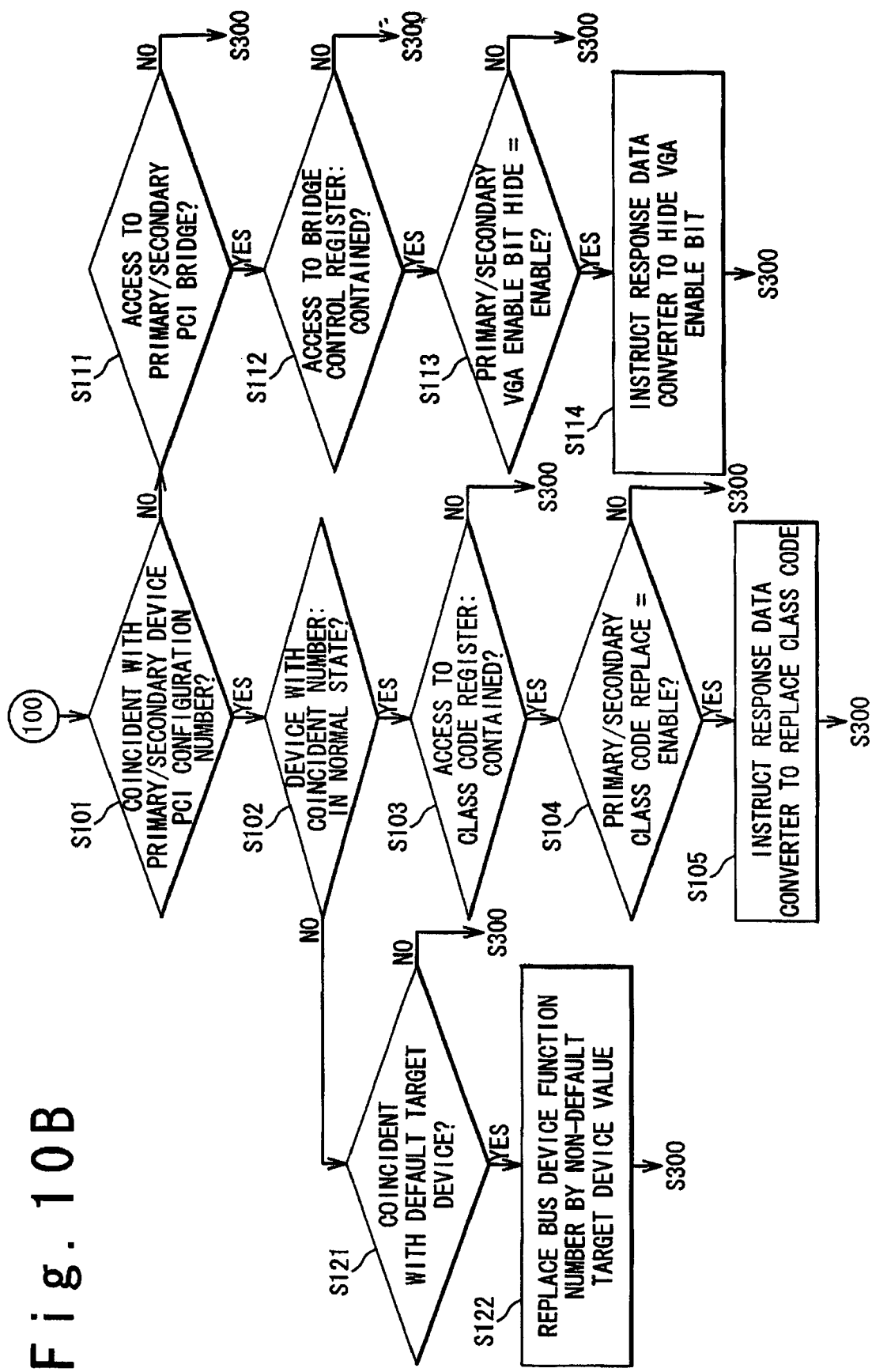

FIGS. 10A to 10C are a flowchart showing the operation of the routing controller 4 of the FT computer system 1 according to the present invention. At first, the CPU 2 issues a read request to a certain device (target). When receiving the read request from the CPU 2, the address converter 43 examines a type of the access (Step S1). When the type of the access is not any of the foregoing three types, the address converter 43 merely forwards the request to the router 45 (Step S300). The router 45 carries out the routing to the device that is the target (Step S301).

(1) PCI Configuration Access

Figure 1:
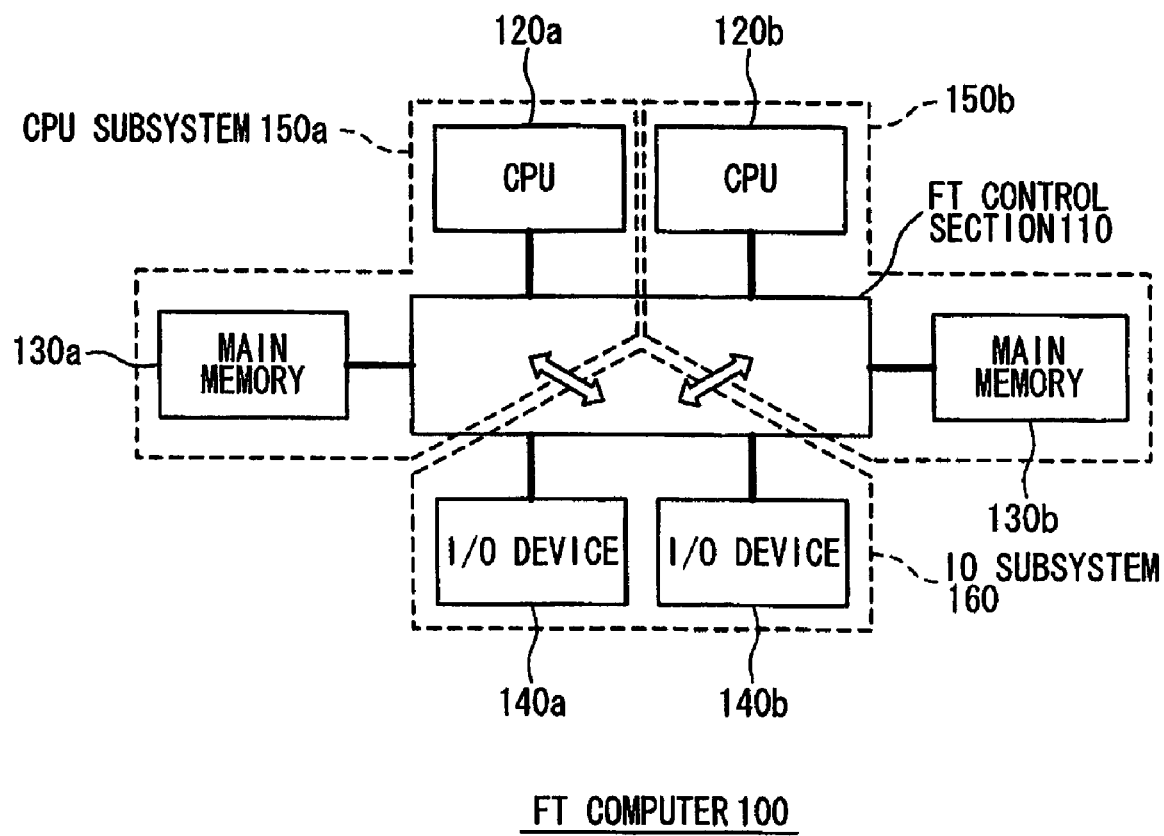
FIG. 1 is a block diagram showing schematically showing the configuration of a conventional fault tolerant (FT) computer system.

At the step S1, when the type of the access is "PCI Configuration Access", the control flow shown in FIG. 1B is executed. When the CPU 2 issues the read request to the PCI configuration register (refer to FIG. 8), the address converter 43 of the controller 40 extracts a bus number, a device number, a function number and a register offset address from that request. Then, the address converter 43 of the controller 40 compares the extracted values with the values set for "Primary/Secondary Device PCI Config. Number (registers 53*a*, 53*b*)" (Step S101). For example, if the extracted values are matched with the values set in "Secondary Device PCI Config. Number" (Step S101; Yes), the address converter 43 of the controller 40 determines whether or not the matched device is in a normal state, in accordance with the error data stored in the error detector 42 (Step S102). If the matched device is in the normal state (Step S102; Yes), the address converter 43 of the controller 40 further examines the register offset address and determines whether or not the address is within the range of the addresses (09h to 0Bh: refer to FIG. 5) of the class code register (Step S103).

If the access to the class code register is not included (Step S103; No), a step S300 is executed. If the access to the class code register is included (Step S103; Yes), the address converter 43 of the controller 40 confirms the setting of "Secondary Device Class Code Replace" (Step S104). Here, since the "Secondary Device Class Code Replace" has been set to "Enable" (Step S104; Yes), the controller 40 instructs the response data converter 44 to replace the class code (Step S105). Then, the step S300 is executed.

Subsequently, the response data is returned from the secondary VGA device 8b. When receiving the response data, the response data converter 44 replaces the class code indicated in the response data by "FF0000h" set in "Replace Class Code". Then, the response data converter 44 passes the conversion response data after the replacement to the CPU 2. Through the above-mentioned sequence, when the OS accesses the class code of the standby VGA device 8b, "FF0000h (Other Device)" is always returned. Thus, the OS never recognizes existence of the two VGA devices 8a and 8b.

Also, it is supposed that the request from the CPU 2 is a read request for referring to "VGA Enable bit" of the secondary PCI bridge 6b (Step S101; No, Step S111; Yes). The "VGA Enable bit" is defined by "PCI-to-PCI Bridge Specification" and exists in a bridge control register (Offset Address: 3Eh). If the access to that location is recognized (Step S112; Yes), the address converter 43 of the controller 40 refers to "Secondary VGA Enable bit Hide" (Step S113). Here, the "Secondary VGA Enable bit Hide" is set to the "Enable" (Step S113; Yes). Therefore, the controller 40 instructs the response data converter 44 to hide the "VGA Enable bit" (Step S114). Then, the step S300 is executed.

Subsequently, the secondary PCI bridge 6b returns the response data. When receiving the response data, the response data converter 44 replaces the "VGA Enable bit" indicated in the response data, by "Disable(=0)". Then, the response data converter 44 forwards the conversion response data after the replacement, to the CPU 2, Through the above-mentioned sequence, when the OS accesses the "VGA Enable bit" of the PCI bridge 6b on the standby side, "Disable" is always returned. Thus, the PCI bridge 6b on the standby side is hidden from the OS. The PCI bridge which appears to the OS as if the "VGA Enable bit" has been set although the "VGA Enable bits" are actually set in the plurality of PCI bridges 6 is limited to the PCI bridge 6a on the primary system side. Therefore, the mismatching is never generated for the OS.

Next, a case where a fault has occurred in the active VGA device 8a, or a case where any error is generated in the active VGA device 8a will be described. The data with regard to this fault is reported to the controller 40 by the error detector 42.

Figure 11:
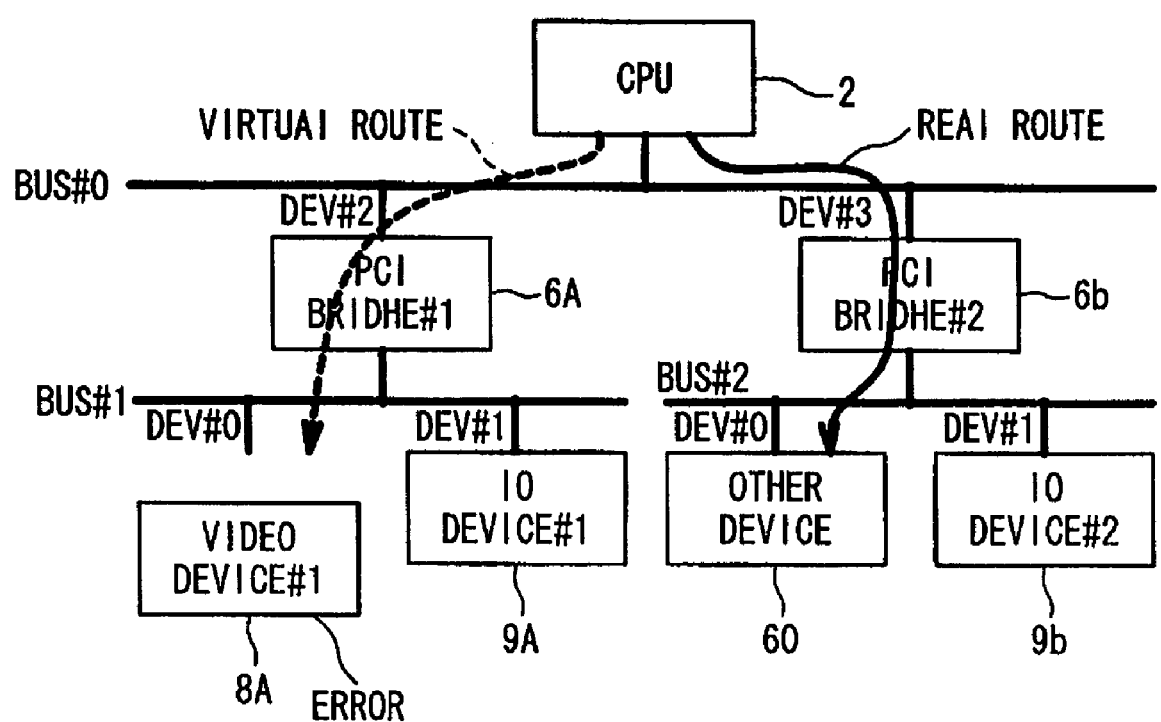
FIG. 11 is a diagram showing an example of an operation of the FT computer system according to the present invention.
Figure 12:
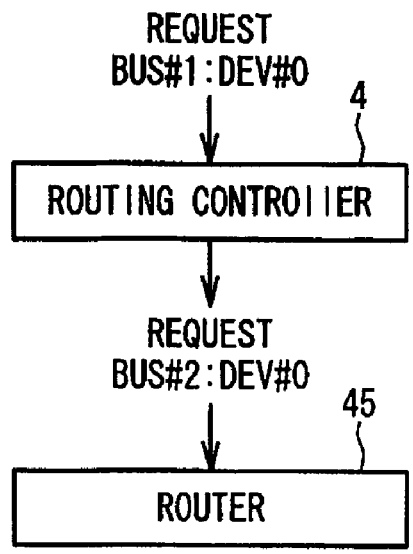
FIG. 12 is a diagram showing an example of an operation of the FT computer system according to the present invention.

When the CPU 2 issues a read request to the active VGA device 8a, the address converter 43 of the controller 40 extracts the bus number, the device number, the function number and the register offset address from the read request. Then, the address converter 43 of the controller 40 compares the extracted values with the values set in "Primary/Secondary Device PCI Config. Number" (Step S101). Here, it is supposed that the extracted values are matched with the values set in the "Primary Device PCI Config. Number" (Step S101; Yes). Also, it is supposed that the active VGA device 8a as the access target is in a fault state (Step S102; No). At this time, the address converter 43 of the controller 40 determines whether or not the active VGA device 8a as the access target is matched with "Default" (Step S121). If it is not matched (Step S121; No), the step S300 is executed. In this example, the access target is matched with the default target (Step S121; Yes). In this case, the address converter 43 refers to the "Secondary Device PCI Config. Number" and replaces the extracted values by the bus number, device number and function number of the standby VGA device 8b that is not the default (Step S122). In this way, the conversion address data is generated. Then, the address converter 43 outputs "Conversion Request Data" including the generated conversion address data, to the router 45 (Step S300). In this example, a request to "Bus #1: Dev #0: Func #0" is rewritten to a request to "Bus #2: Dev #0: Func #0". As a result, as shown in FIG. 11, the read request is routed to the secondary VGA device 8b (60). As shown in FIG. 14, the access to the primary VGA device 8a is replaced by the access to the secondary VGA device 8b (60). Thus, the fault of the primary VGA device 8a can be hidden from the OS, and the process can be continued. It seems to the OS as if the primary VGA device 8a continues to be accessed.

(2) Memory Mapped PCI Access

At the step S1, when the type of the access is the "Memory Mapped PCI Access", the control flow shown in FIG. 10C is executed. The system memory map shown in FIGS. 9A and 9B are referred to in case of this "Memory Mapped PCI Access". At first, when the read request is received from the CPU 2, the address converter 43 of the controller 40 checks its request address (Step S201, Step S211). For example, if the read request to the standard VGA space (A0000h to BFFFFh) is issued from the CPU 2 (Step S201; No, Step S211; Yes), the address converter 43 of the controller 40 checks whether or not an error occurs in the default device specified by the "Default Target Device" (Step S212). If the default device is in the normal state (Step S212; No), the address converter 43 instructs the router 45 to forcedly route the read request to the PCI bridge 6a on the default side (Step S213). Thus, the read request is routed to the PCI bridge 6a on the primary system side and consequently routed to the active VGA device 8a on the primary system side.

Figure 13:
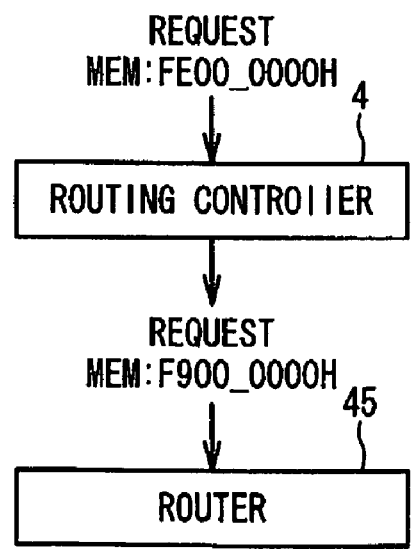
FIG. 13 is a diagram showing an example of an operation of the FT computer system according to the present invention.

If a fault has occurred in the default device (Step S212; Yes), the address converter 43 instructs the router 45 to forcedly route the read request to the PCI bridge 6 on the non-default side device (standby side) (Step S230). Thus, the read request is routed to the PCI bridge 6b on the secondary system side and consequently routed to the standby VGA device 8b on the secondary system side. Also, for example, if the request address is included in the address space of the VGA device 8 (Step S201; Yes), the address converter 43 of the controller 40 confirms whether or not the fault has occurred in the VGA device 8 as the target (Step S02). If the primary VGA device 8a is in the normal state (Step S202; No), the step S300 is executed. If the fault has occurred in the primary VGA device 8a as the target (Step S202; Yes), the controller 40 determines whether or not the target is matched with the default device (Step S221). In case of this example, the primary VGA device 8a is the default device (Step S221; Yes). Thus, the address converter 43 replaces the request address by the address of the secondary VGA device 8b on the non-default side (Step S222). In this example, as shown in FIG. 13, a request to "FE00_0000h" is rewritten to a request to "F900_0000h". These address values are calculated in accordance with "Primary/Secondary Base Address" and "Primary/Secondary Base Size". Thus, as shown in FIG. 11, the read request is routed to the secondary VGA device 8b (60). Therefore, the fault of the primary VGA device 8a can be hidden from the OS, and the process can be continued. It seems to the OS as if the primary VGA device 8a continues to be accessed.

It should be noted that in the usual case, the OS does not directly access the "Other Device" (standby VGA device 8b)

whose function is unknown. Even if a fault has occurred in the "Other Device", the routing controller 4 does not report the fault to the CPU 2, similarly to the operation for hiding the fault in the active devices. Thus, a secondary fault does not lead to the system-down.

As described above, according to the FT computer system 1 of the present invention, the dual control for the two VGA devices 8 in the active system and the standby system is attained. At the time of the occurrence of a fault, the switching process using the hardware is carried out, thereby to allow the usual process to be continued. Here, the dual control is carried out in a manner hidden from the OS, and the error of the VGA device 8 and the like are perfectly hidden from the OS.

Specifically, in case of accessing the "PCI Configuration Register" of the VGA device 8, the class code is replaced, and in case of accessing the PCI bridge 6, the "VGA Enable bit" is hidden, and at the time of the occurrence of the fault, the address is replaced. In short, the situation where the standard VGA device on the active side continues to be always used is produced for the OS in a pseudo manner. The number of the VGA devices 8 visible from the OS is always one (only the standard VGA device). Thus, the dual control for the VGA device 8 is possible without any special modification to the OS. Also, the dual control is possible even if the typical open-system device is employed as the I/O devices 8 and 9 and the PCI bridge 6. That is, even in the server including the existing OS, I/O device and I/O device driver which are produced without any intention of the FT computer system, the duplication of the I/O devices and the fail-over can be attained. Thus, the fault tolerance and reliability of the open-system server is improved.

It should be noted that in the embodiments, the VGA device 8 is indicated as the example of the I/O device. However, the present invention is effective for the devices other than the VGA device 8. In short, the similar switching function and hiding function are applied to the devices other than the VGA device. Thus, the open-system devices can be dually controlled by using the hardware.

According to the present invention, the FT computer system where the open-system hardware and software are used as the base is attained. In particular, according to the FT computer system of the present invention, it is possible to carry out the dual control of the I/O device (hardware) without modifying the existing OS or I/O device driver. Thus, the fault tolerance and reliability of the open server is improved.

What is claimed is:

1. A fault tolerant (FT) computer system comprising:
    a first system as an active system comprising first I/O devices; and
    a second system as a standby system comprising second I/O devices, which are the same as said first I/O devices, said second system connected with said first system through a link section, and configured to operate in synchronization with said first systems;
    wherein each of said first and second systems comprises a CPU;
    wherein said first system comprises an operating system (OS) and a routing controller connected with the CPU of said first systems;
    wherein said routing controller in said first system is configured to control a routing between said CPU in said first system and said first and second I/O devices;
    wherein the first and second systems are configured such that the second I/O devices are not visible to the OS of the first system before a fault has occurred in one of said first I/O devices; and
    wherein, when a fault has occurred in one of said first I/O devices, said routing controller in said first system is configured to route a request data, received from said CPU in said first system and destined to said first I/O device, to one of said second I/O devices corresponding to said first I/O device with the fault.

2. The fault tolerant computer system according to claim 1, wherein said routing controller in said first system comprises:
    an address converter connected with said CPU of the first system;
    a response data converter connected with said CPU of the first system; and
    a router connected with said address converter and said response data converter;
    wherein said fault tolerant computer system is configured such that, when the fault has occurred in said first I/O device, said address converter generates a converted request data from said request data by replacing a device data indicating said first I/O device by a device data indicating said second I/O device, if receiving said request data from said CPU of the first system, and forwards the converted request data to said router; and
    wherein said router is configured to route said converted request data to said second I/O device based on said device data contained in said converted request data.

3. The fault tolerant computer system according to claim 2, wherein said device data is a PCI bus number, a device number and a function number in a PCI hierarchy structure.

4. The fault tolerant computer system according to claim 3, wherein said routing controller in said first system further comprises:
    a register configured to be accessible to said address converter and configured to store said PCI bus number, said device number, and said function number.

5. The fault tolerant computer system according to claim 2, wherein said device data is an address in a system memory map space.

6. The fault tolerant computer system according to claim 5, wherein said routing controller in said first system further comprises:
    a register configured to be accessible to said address converter and configured to store said address.

7. The fault tolerant computer system according to claim 2, wherein said response data converter is configured to generate a converted response data from a response data by rewriting a part of said response data, when said second I/O device operates in a normal state and said response data converter receives said response data from said second I/O device through said router, and output said converted response data to said CPU in said first system.

8. The fault tolerant computer system according to claim 7, wherein said response data converter is configured to generate said converted response data by replacing a class code of said second I/O device which is contained in said response data by another class code.

9. The fault tolerant computer system according to claim 8, wherein said routing controller in said first system further comprises:
    a register configured to be accessible to said response data converter and configured to store said another class code.

10. The fault tolerant computer system according to claim 2, wherein:
    said second system further comprises a routing controller;
    said first system comprises a first PCI bridge as one of said first I/O devices connected with said routing controller of said first system and said first I/O device; and said second system comprises a second PCI bridge as one of said second I/O devices connected with said routing controller of said second system and said second I/O device;

wherein the fault tolerant computer system is configured such that a VGA Enable bit of said first PCI bridge and a VGA Enable bit of said second PCI bridge are both set to Enable when said first I/O device and said second I/O device operate in a normal state.

11. The fault tolerant computer system according to claim 10, configured such that when an access to said VGA Enable bit of said second PCI bridge is generated, said response data converter receives said VGA Enable bit from said second PCI bridge through said router, and converts the received VGA Enable bit into Disable.

12. The fault tolerant computer system according to claim 10, configured such that said first I/O devices and said second I/O devices are open-system devices.

13. The fault tolerant computer system according to claim 1, wherein said first I/O device and said second I/O device are VGA devices.

14. A fault tolerant (FT) computer system comprising:
a first system comprising a first I/O device as an activist I/O device and an operating system (OS); and
a second system comprising a second I/O device as a standby I/O device, which is the same as said first I/O device, said second system connected with said first system through a link section, and configured to operate in synchronization with said first system,
wherein each of said first and second systems comprises:
a CPU; and
a routing controller, connected with said CPU and configured to control a routing between said CPU and said first I/O device and said second I/O device;
wherein said routing controller comprises a register group and a controllers;
wherein said controller of said routing controller comprises:
an address converter connected with said CPU and configured to selectively convert a request data output from said CPU based on a first data stored in said register group;
a response data converter connected with said CPU and configured to selectively convert a response data to be output to said CPU, based on a second data stored in said register group; and
a router connected with said address converter and said response data converter and configured to route said request data and said response data; and
wherein said fault tolerant computer system is configured such that, before a fault has occurred in the first I/O device, the first I/O device is visible to the OS of the first system and the second I/O device is hidden from the OS of the first system.

15. The fault tolerant computer system according to claim 14, configured such that when a fault has occurred in said first I/O device, said routing controller in said first system routes said request data received from said CPU in said first system and destined to said first I/O device, to said second I/O device.

16. The fault tolerant computer system according to claim 14, wherein said response data converter in said first system is configured to convert said response data based on said second data, if receiving said response data from said second I/O device through said router, when said first and second I/O devices operate in a normal state, and output said converted response data to said CPU in said first system.

17. The fault tolerant computer system according to claim 14, wherein said first system further comprises a first PCI bridge as a second I/O device connected with said routing controller of said first system and with said first I/O device; and
wherein said second system further comprises a second PCI bridge as a second I/O device connected with said routing controller of said second system and with said second I/O device; and
wherein said fault tolerant computer system is configured such that a VGA Enable bit of said first PCI bridge and a VGA Enable bit of said second PCI bridge are both set to Enable when said first I/O device and said second I/O device operate in a normal state.

18. The fault tolerant computer system according to claim 14, wherein said first I/O device and said second I/O device are VGA devices.

19. The FT computer system of claim 1, wherein the first system and the second system operate perfectly in synchronization with each other, including clocks.

20. The FT computer system of claim 1, configured such that, after the fault has occurred, said first I/O device with the fault becomes hidden from the OS of the first system and said corresponding second I/O device becomes visible to the OS of the first system.

21. The FT computer system of claim 20, configured such that I/O device switching due to the fault is carried out in hardware, and the OS is not aware of the switching and of the fault.

22. The FT computer system of claim 21, configured such that the OS of the first system continues to operate as though said first I/O devices are active even after said I/O switching to corresponding second I/O devices.

23. The FT computer system of claim 20, wherein:
the routing controller of said first system comprises a class code register; and
the first system is configured such that switching between a first I/O device and a corresponding second I/O device when a fault has occurred involves replacing said class code with a different value.

24. The FT computer system of claim 20, wherein said first system is configured such that:
memory space is allocated to each of first I/O devices; and
addresses of active first or second I/O devices are registered in said memory space, and addresses of hidden first or second I/O devices are not registered in said memory space.

25. The FT computer system of claim 24, wherein:
said first system further comprises a PCI bridge connected between said routing controller and said first I/O devices;
said first system is configured such that said PCI bridge uses said memory space in accessing I/O devices; and
said first system is configured such that I/O devices not registered in said memory space are physically disabled.

26. The FT computer system of claim 1, configured such that:
an inactive I/O device in the first or second system is invisible to the OS, and a corresponding active I/O device in the second or first system is visible to the OS; and
after a fault has occurred in said corresponding active I/O device in the second or first system, said corresponding active I/O device in the second or first system becomes inactive and invisible to the OS, and said inactive I/O in the first or second system becomes active and visible to the OS.

27. The FT computer system of claim 13, configured such that:
  when a first VGA device in the first or second system is used and visible to the OS, a corresponding second VGA device in the second or first system is hidden from the OS; and
  after a fault has occurred in said first VGA device, said first VGA device becomes hidden from the OS, and said second VGA device becomes visible to the OS.

28. The FT computer system of claim 14, configured such that, when a fault occurs in said first I/O device, said first I/O device becomes hidden from the OS of the first system, and said second I/O device becomes visible to the OS of the first system.

29. The FT computer system of claim 28, configured such that switching, from the first I/O device to the second I/O device when a fault occurs in said first I/O device, is carried out in hardware with said switching and said fault hidden from the OS.

* * * * *

UNITED STATES PATENT AND TRADEMARK OFFICE
CERTIFICATE OF CORRECTION

| | | |
|---|---|---|
| PATENT NO. | : 7,610,509 B2 | Page 1 of 1 |
| APPLICATION NO. | : 11/304890 | |
| DATED | : October 27, 2009 | |
| INVENTOR(S) | : Shinji Abe | |

It is certified that error appears in the above-identified patent and that said Letters Patent is hereby corrected as shown below:

Column 15, line 60 (claim 1) delete "systems", insert --system--

Column 18, line 5 (claim 17) delete "and"

Signed and Sealed this

Fifteenth Day of June, 2010

David J. Kappos
*Director of the United States Patent and Trademark Office*